United States Patent
Reusche et al.

(10) Patent No.: US 7,117,905 B2
(45) Date of Patent: Oct. 10, 2006

(54) SYSTEM AND METHOD FOR AUTOMATICALLY FILLING A LIQUID RECEPTACLE

(75) Inventors: Thomas K. Reusche, Elburn, IL (US); Philip E. Chumbley, Aurora, IL (US); James R. McHugh, Downers Grove, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 0 days.

(21) Appl. No.: 11/269,063

(22) Filed: Nov. 8, 2005

(65) Prior Publication Data
US 2006/0096659 A1 May 11, 2006

Related U.S. Application Data

(63) Continuation-in-part of application No. 10/984,125, filed on Nov. 8, 2004.

(51) Int. Cl.
*B65B 1/04* (2006.01)

(52) U.S. Cl. .......................... 141/198; 4/508; 119/69.5
(58) Field of Classification Search ................ 141/198, 141/95; 137/426, 410; 4/368–376, 508; 119/69.5
See application file for complete search history.

(56) References Cited

U.S. PATENT DOCUMENTS

| | | | | | |
|---|---|---|---|---|---|
| 3,024,799 | A | * | 3/1962 | Flieder | 137/207 |
| 3,908,206 | A | * | 9/1975 | Grewing | 4/508 |
| 5,301,375 | A | * | 4/1994 | Osmond | 4/368 |
| 5,439,019 | A | * | 8/1995 | Quandt et al. | 137/2 |
| 5,743,212 | A | * | 4/1998 | Forjohn | 119/69.5 |
| 5,790,991 | A | * | 8/1998 | Johnson | 4/508 |
| 6,647,922 | B1 | * | 11/2003 | Travis | 119/69.5 |
| 6,675,398 | B1 | * | 1/2004 | Antunez | 4/366 |

* cited by examiner

*Primary Examiner*—Steven O. Douglas
(74) *Attorney, Agent, or Firm*—McAndrews, Held & Malloy, Ltd.

(57) ABSTRACT

An automatic liquid filling system including a liquid supply, a liquid-retaining structure, and a filling apparatus in fluid communication with the liquid supply and the liquid-retaining structure. The filling apparatus is configured to automatically supply liquid to the liquid-retaining structure when the liquid recedes below a low level that is based on a position of the filling apparatus in relation to the liquid-retaining structure.

20 Claims, 6 Drawing Sheets

SYSTEM AND METHOD FOR AUTOMATICALLY FILLING A LIQUID RECEPTACLE

RELATED APPLICATIONS

The present application is a continuation-in-part of U.S. Non-Provisional Application Ser. No. 10/984,125, entitled "SYSTEM AND METHOD FOR AUTOMATICALLY FILLING A LIQUID RECEPTACLE," which was filed on Nov. 8, 2004.

BACKGROUND OF THE INVENTION

Embodiments of the present invention generally relate to a system and method of filling a liquid receptacle, and more particularly to a system and method of automatically filling a liquid-retaining structure, such as a bird bath.

Various liquid-retaining structures, such as bird baths, pet water bowls, livestock troughs, aquariums, pools, and the like require a minimal amount of liquid to adequately operate. For example, if the water level in a bird bath is too low, birds will not be attracted to the bird bath. Similarly, a livestock water trough will be incapable of providing water to livestock if the trough is empty.

In order to maintain suitable water levels within liquid-retaining structures, a user typically monitors the liquid levels within the structures. When the liquid level within a structure is too low, the user typically refills the structure. The water level within the structure remains low or empty until the user decides to refill the structure. As such, if the user is absent for a given period of time, the liquid-retaining structure will remain low or empty until the user returns and refills the structure.

Thus, a need exists for a safe, efficient, cost-effective manner of automatically filling a water-retaining structure, such as a bird bath, pool, pond, livestock water trough, aquarium, or the like.

BRIEF SUMMARY OF THE INVENTION

Embodiments of the present invention provide an automatic liquid filling system that includes a liquid supply, a liquid-retaining structure configured to receive and retain liquid, and a filling apparatus in fluid communication, e.g., by way of garden hoses, with the liquid supply and the liquid-retaining structure. The filling apparatus is configured to automatically supply liquid to the liquid-retaining structure when the liquid recedes below a low level that is based on a position, e.g., the height, of the filling apparatus in relation to the liquid-retaining structure. In general, the liquid levels within the filling apparatus and the liquid-retaining structure are equal due to ambient air pressure.

The system may also include a support structure. The filling apparatus is supported on the support structure, and the low level is based on a vertical position of the filling apparatus on the support structure.

The liquid-retaining structure may be a basin of a bird-bath, a livestock water trough, a pet water receptacle, an aquarium, a pool, or various other structures that receive and retain a liquid.

The filling apparatus may include a liquid reservoir having a liquid-retaining cavity, wherein a liquid inlet and liquid outlet are formed through the liquid-retaining cavity. The filling apparatus may also include an inlet valve tube connected to the liquid inlet. The inlet valve tube may be configured to receive liquid through the liquid inlet. Liquid may pass through the inlet valve tube when the inlet valve tube is open and liquid may be prevented from passing through the inlet valve tube when the inlet valve tube is closed. The filling apparatus may also include a buoyant member positioned within the liquid-retaining cavity. The buoyant member may be configured to float within the liquid-retaining cavity. The buoyant member may be configured to float between a first position, which the buoyant member occupies when the liquid level in the liquid-retaining cavity is at a low level, and a second position, which the buoyant member occupies when the liquid level in the liquid-retaining cavity is at a high level. The buoyant member may be operatively connected to the inlet valve tube such that the inlet valve tube opens when the buoyant member is in the first position and the inlet valve tube closes when the buoyant member is in the second position.

An outlet valve tube configured to receive liquid from the inlet valve tube may be connected to the inlet valve tube. The outlet valve tube may be connected to the liquid outlet such that liquid passes through the liquid outlet. The outlet valve tube may include an opening configured to allow liquid to enter the liquid-retaining cavity.

The outlet valve tube may be connected to a fluid diversion valve such that liquid passes to the fluid diversion valve. The fluid diversion valve may be connected to the liquid outlet such that liquid passes through the liquid outlet. The fluid diversion valve may include an opening configured to allow liquid to enter the liquid-retaining cavity.

A mounting bracket may be secured to the liquid reservoir, and may movably engage a support structure so that the liquid reservoir may be adjusted to various levels.

The filling apparatus may include a pressure sensor and a fill valve. The pressure sensor may detect the pressure inside the liquid-retaining cavity. The fill valve may be connected to the liquid inlet. Based on the pressure detected by the pressure sensor, the fill valve may selectively open and close such that liquid is allowed to pass through the fill valve when the fill valve is open and liquid is prevented from passing through the fill valve when the fill valve is closed.

Embodiments of the present invention also provide a method of operating an automatic-liquid filling system. The method includes positioning a filling apparatus on a support structure at a position that corresponds to a desired liquid level of a liquid-retaining structure; connecting the filling apparatus to the liquid-retaining structure and a liquid supply; and automatically filling a liquid reservoir of the filling apparatus and the liquid-retaining structure to the desired liquid level with liquid from the liquid supply when liquid in the liquid reservoir is below a certain level.

Figure 1:
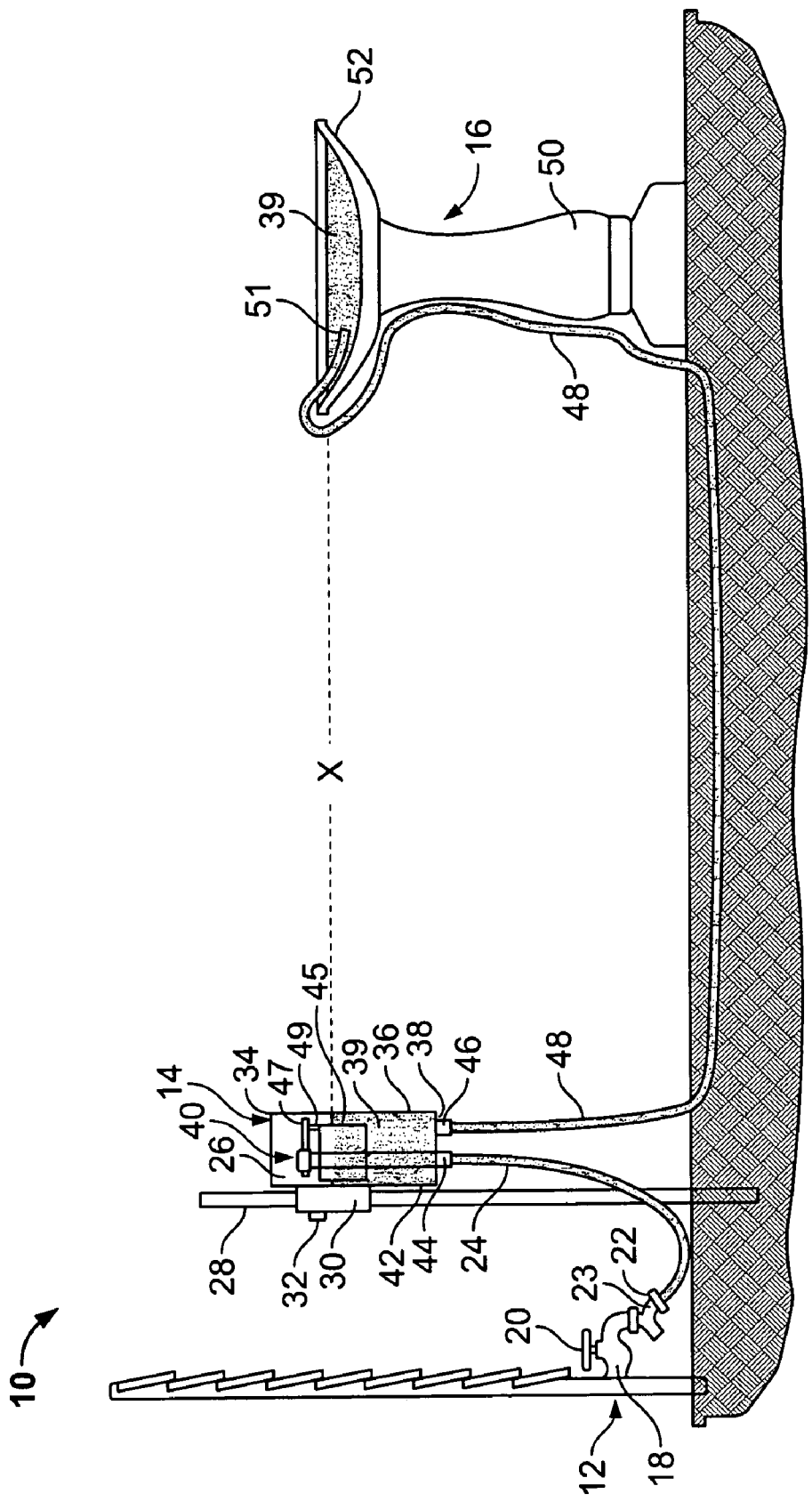
FIG. 1 illustrates an automatic liquid-filling system, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an automatic liquid-filling system 10, according to an embodiment of the present invention. The system 10 includes a water supply 12, a filling apparatus 14, and a water-retaining structure, such as a bird bath 16.

The water supply 12 may be an ordinary faucet 18 having an opening valve 20 and a water outlet 22. The faucet 18 is in fluid communication with a water supply system (not shown). The faucet 18 may be the type commonly found on various residential homes. The faucet 18 is fluidly connected to the filling apparatus 14 through a hose 24 that is connected to the water outlet 22. A dual-outlet Y connector 23 may be disposed between the water outlet 22 and the hose 24. Thus, the faucet 18 may still be used for various other applications.

The filling apparatus 14 includes a water reservoir 26 mounted to a support structure 28, such as a pole, rail, column, or another such upwardly standing structure, through a bracket 30. The bracket 30 includes a support structure channel (not shown) that is configured to allow the bracket 30, and therefore the water reservoir 26, to slide or otherwise move over the surface of the support structure 28. The bracket 30 also includes a fastener 32 that is configured to engage the support structure 28 so that the water reservoir 26 may be secured at a desired position.

The water reservoir 26 includes a main body 34 defined by lateral walls 36 integrally formed with a base 38. The water reservoir 26 is configured to receive and retain water 39 within a fluid-retaining cavity 40 that is defined between the lateral walls 36 and the base 38. An inlet valve tube 42 extends through the base 38 and into the fluid retaining cavity 40. The inlet tube 42 includes a water inlet 44 that is fluidly connected to the hose 24. The inlet valve tube 42 may be configured to allow water to pass therethrough until a desired water level is reached. Once the desired water level is reached, the inlet valve tube 42 closes, thereby preventing additional water from passing therethrough. Thus, the water reservoir 26 may receive and retain the water 39 from the water supply 12 through the hose 24.

A float 45 is slidably positioned over the inlet valve tube 42 and is operatively connected to an lever 47 positioned on top of the inlet valve tube 42 through a translation member 49, such as a chain, beam, or other such structure that is capable of connecting the level to the float 45. Optionally, the float 45 may simply be positioned within fluid-retaining cavity 40, but not be positioned over the inlet valve tube 42.

The float 45 may be formed of various types of buoyant material, such as Styrofoam, rubber, an air-filled structure, or the like. The lever 47 is operatively connected to the inlet valve tube 42, so that the lever 47 may selectively open and close the inlet valve tube 42.

A water outlet 46 is also formed through the base 38 of the water reservoir 26, and allows water to pass out of the cavity 40. The water outlet 46 is fluidly-connected to a hose 48 and acts as a fluid conduit from the water reservoir 26 to the bird bath 16. A portion of the hose 48 may be positioned underground.

The birdbath 16 includes a pedestal 50 that supports a water-retaining basin 52. A water outlet 51 of the hose 48 is positioned within the basin 52 to allow water to pass from the hose 48 into the basin 52. The hose 48 may be secured to the pedestal 48 and basin 52 through various fasteners, such as clips, ties, and the like. While the system 10 is shown with a birdbath 16, the system 10 may also be used with various water retaining structures, such as aquariums, ponds, pools, and the like.

In operation, the water reservoir 26 is set to a desired water level height, which corresponds to a desired liquid level within the basin 52. Once the water reservoir 26 is set at a desired height, the activation lever 47 is depressed, thereby opening the inlet valve tube 42 so that water 39 may be supplied to the water reservoir 26. Water 39 continues to pass into the water reservoir 26 until the float 45 floats to a position at which the lever 47 reaches a closing position. At the closing position, the lever 47 closes the inlet valve tube 42, thereby preventing additional water from entering the water reservoir 26.

The water 39 passes out of water outlet 46, through the hose 48, and into the basin 52. The water 39 continues into the basin 52 until the lever 47 reaches the closing position. The water level x within the basin 52 is the same as that within the water reservoir 26 because the hose 48 remains filled with water. As such, the water level x within the basin 52 and the reservoir 26 will be equal due to the ambient air pressure exerted on the water 39 within the basin 52 and the water reservoir 26.

Water 39 within the basin 52 may recede for various reasons, including evaporation, activity within the basin, wind, and the like. As the water level x within the basin 52 recedes, so too does the water level x within the water reservoir 26. As the water level x within the reservoir 52 recedes, the float 45 recedes with the water level x. The downward movement of the float 45 exerts a downward force on the translation member 49, which in turn exerts a downward force on a distal end of the lever 47. When the float 45 reaches a valve opening level, the downward force exerted on the distal end of the lever 47 acts to open the inlet valve tube 42, thereby allowing additional water to enter the reservoir 26. Additional water is then supplied to the basin 52. As additional water is supplied to the water reservoir 26, and therefore the basin 52, the water level within the basin 52 and the water reservoir 26 rise. As the water level x rises, the float 45 also rises. Water continues to be supplied to the water reservoir 26 until the distal end of the lever 47 is urged upward into a closed position by the float 45 through the translation member 49. When the lever 47 is in the closed position, the inlet valve tube 42 is closed, thereby preventing additional water from passing into the water reservoir 26. Thus, the bird bath 16 may be automatically filled and maintain a desired water level without the use of electricity, batteries, timers and the like.

Figure 2:
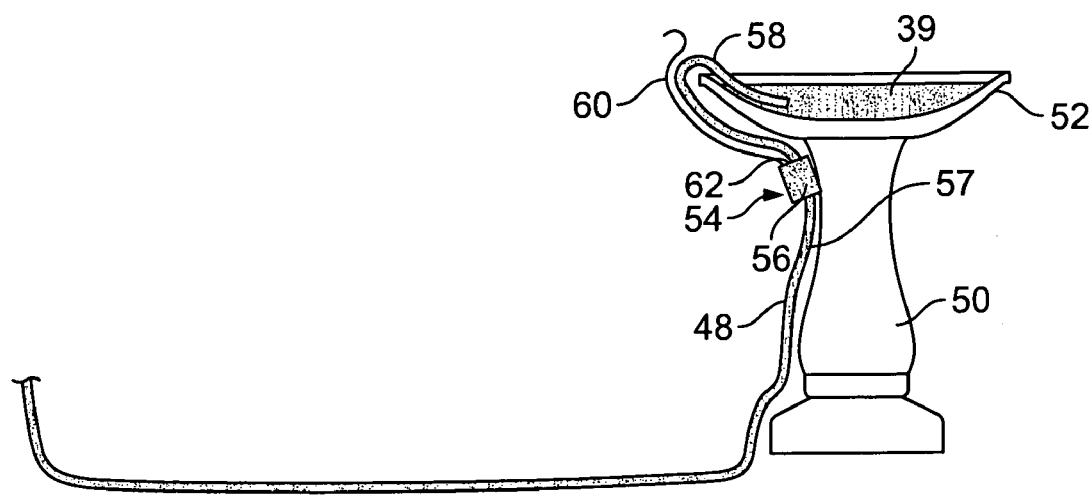
FIG. 2 illustrates a bubble-suppression device, according to an embodiment of the present invention.

FIG. 2 illustrates a bubble-suppression device 54, according to an embodiment of the present invention. An inlet end 56 of the bubble-suppression device 54 is connected to an outlet end 57 of the hose 48. A liquid outlet hose 58 and an air outlet hose 60 are connected, or extend from, an outlet end 62 of the device 54.

Figure 3:
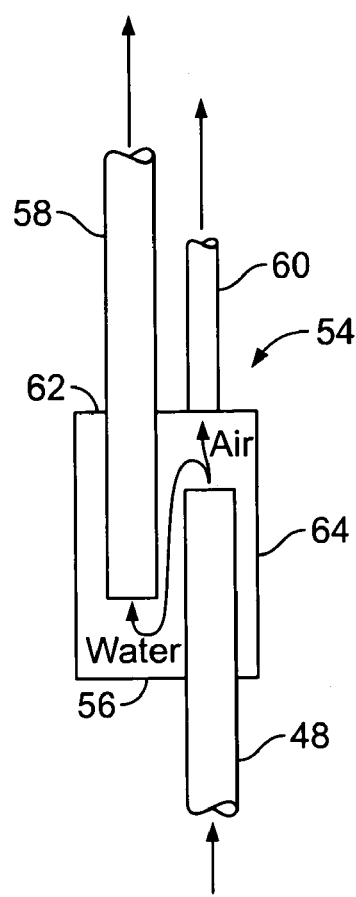
FIG. 3 illustrates a simplified representation of a bubble suppression device, according to an embodiment of the present invention.

FIG. 3 illustrates a simplified representation of the bubble suppression device 54. Water enters a main housing 64 of the bubble suppression device 54 through the hose 48. Any air bubbles entrained within the water supply rise to the upper portion of the main housing 64 and exit through the air outlet hose 60. Water is then passed through the main housing 64 into the liquid outlet hose 58. As such, the water supply within the liquid outlet hose 58 is free of any air. Thus, the bubble suppression device 54 acts to remove air bubbles from the water.

Figure 4:
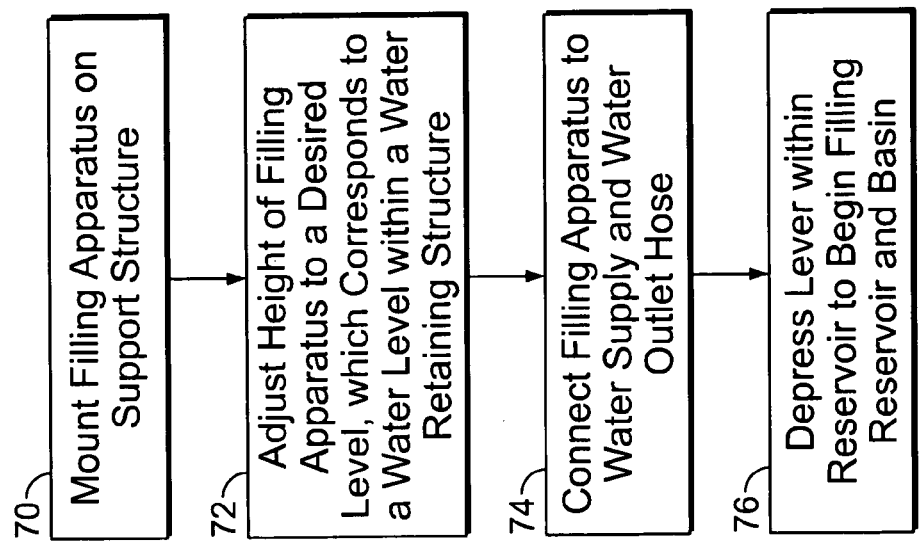
FIG. 4 illustrates a flow chart of a method of installing an automatic liquid-filling system, according to an embodiment of the present invention.

FIG. 4 illustrates a flow chart of a method of installing an automatic liquid-filling system, according to an embodiment of the present invention. First, at 70, the water filling apparatus 14 is mounted on a support structure, such as a pole. Next, at 72, the height of the filling apparatus 14 on the support structure is adjusted to a desired level. That is, the filling apparatus 14 is secured at a level that corresponds to the desired water level within the basin 52 of the bird bath 16. At 74, the filling apparatus is connected to the water supply 12, and the hose 48. The lever 47 within the water reservoir 26 is depressed to open the inlet valve tube 42, so that the water reservoir 26 may be filled with water at 76. Consequently, the inlet valve tube 42 will remain open until the desired water level is reached within the basin 52, as discussed above. The height of the filling apparatus 14 may be adjusted in order to vary the water level within the basin 52.

Figure 5:
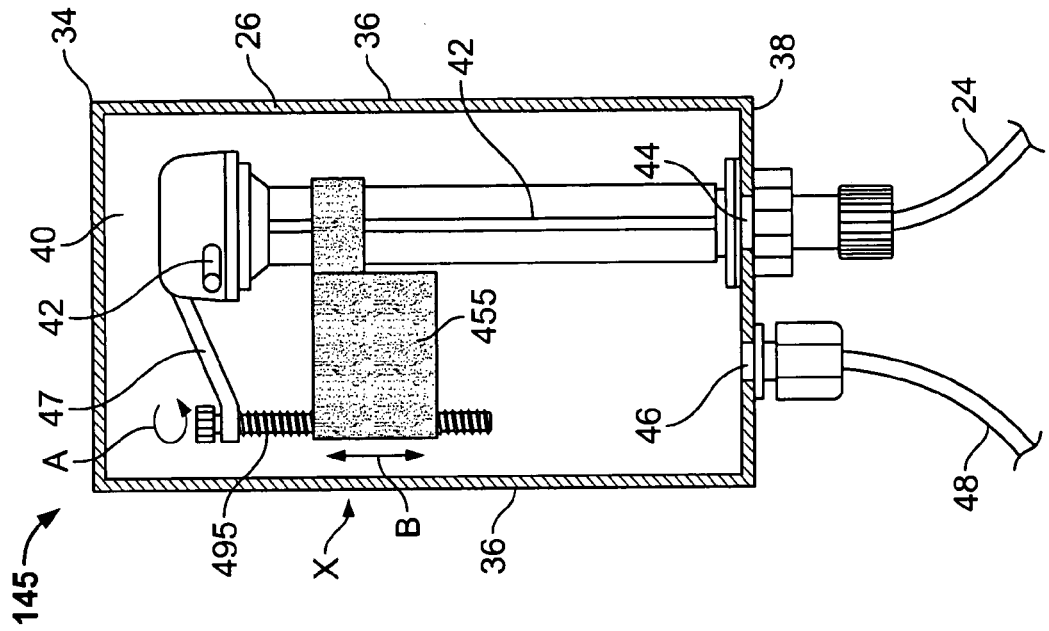
FIG. 5 illustrates a filling apparatus, according to an embodiment of the present invention.

FIG. 5 illustrates a filling apparatus 145, according to an embodiment of the present invention. The filling apparatus 145 is similar to the filling apparatus 14 shown, e.g., in FIG. 1. As such, similar components are numbered accordingly. The filling apparatus 145 includes a threaded translation member 495. The filling apparatus 145 also includes a float 455 that is configured to receive the threaded translation member 495 such that rotation of the threaded translation member 495 about its longitudinal axis varies the level of the float 455 in relation to the lever 47. For example, rotation of the threaded translation member 495 about its longitudinal axis in the direction of arc A may move the float 455 in a downward direction B away from the lever 47, and rotation of the threaded translation member 495 about its longitudinal axis in the direction opposite of arc A may move the float 455 in an upward direction B toward the lever 47. Varying the level of the float 455 in this manner varies the water level x at which the inlet valve tube 42 is open.

Figure 6:
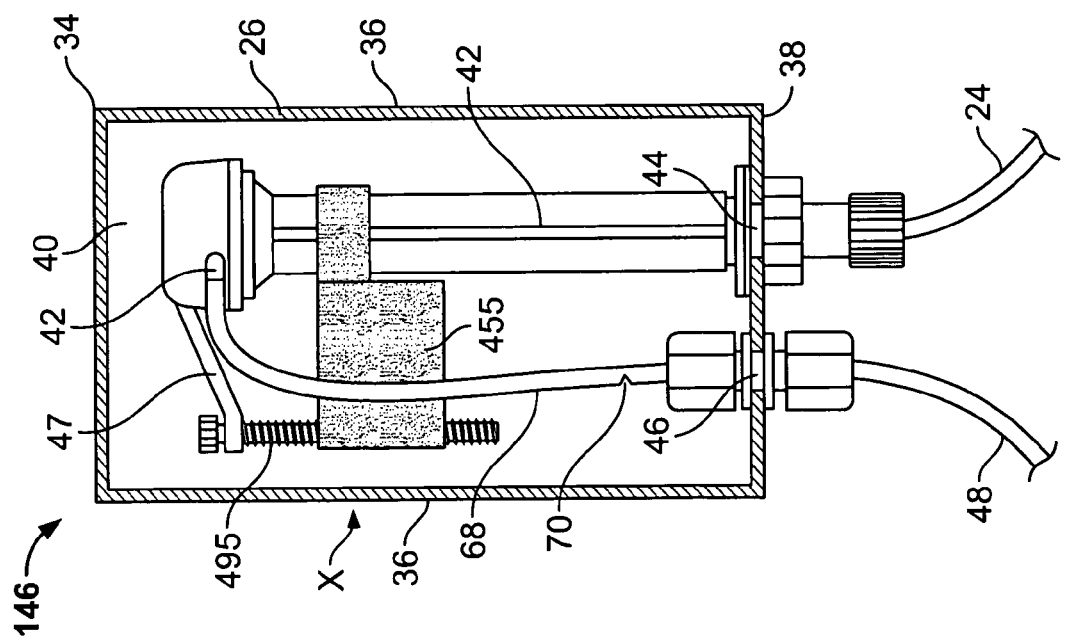
FIG. 6 illustrates a filling apparatus, according to an embodiment of the present invention.

FIG. 6 illustrates a filling apparatus 146, according to an embodiment of the present invention. The filling apparatus 146 is similar to the filling apparatus 14 shown, e.g., in FIG. 1. As such, similar components are numbered accordingly. The filling apparatus 146 includes an outlet valve tube 68. The outlet valve tube 68 is fluidly connected to the inlet valve tube 42 such that fluid flows to the outlet valve tube 68 from the inlet valve tube 42 when the inlet valve tube 42 is open. The outlet valve tube 68 is also fluidly connected to the water outlet 46 such that fluid flows to the water outlet 46 from the outlet valve tube 68. The outlet valve tube 68 includes an opening 70. When fluid flows through the outlet valve tube 68 to the water outlet 46, fluid also flows through the opening 70 into the fluid-retaining cavity 40.

As shown in FIG. 6, one embodiment of the outlet valve tube 68 includes an opening 70 that is a notch-like opening.

Other embodiments of the outlet valve tube 68 may include other types of openings that allow fluid to flow into the fluid-retaining cavity 40.

Figure 7:
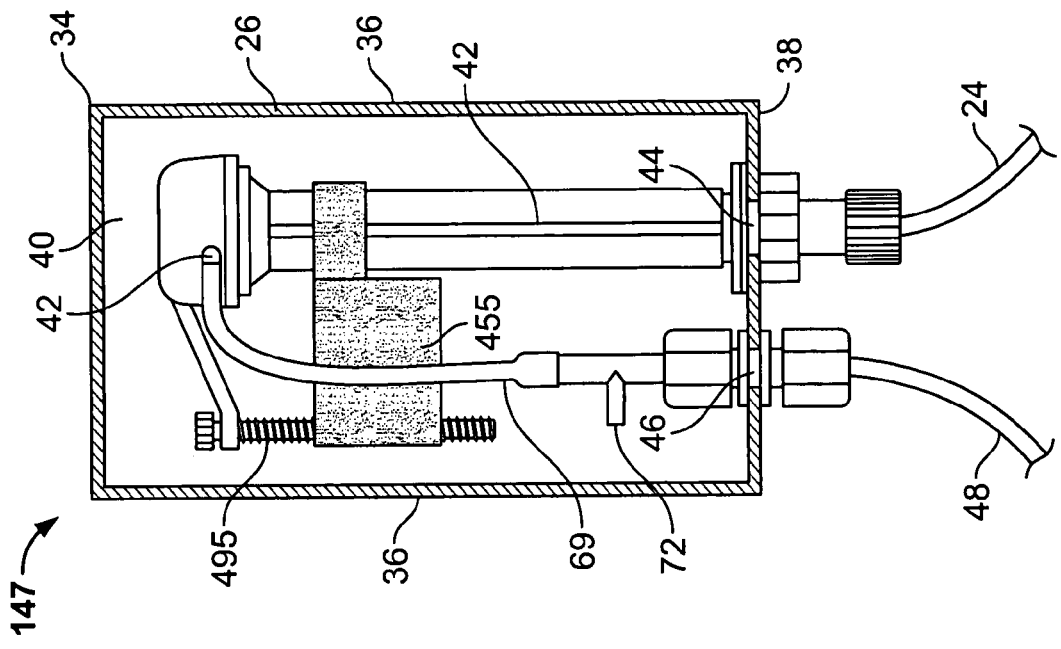
FIG. 7 illustrates a filling apparatus, according to an embodiment of the present invention.

FIG. 7 illustrates a filling apparatus 147, according to an embodiment of the present invention. The filling apparatus 147 is similar to the filling apparatus 14 shown, e.g., in FIG. 1. As such, similar components are numbered accordingly. The filling apparatus 147 illustrated in FIG. 7 includes an outlet valve tube 68. The outlet valve tube 68 is fluidly connected to the inlet valve tube 42 such that fluid flows to the outlet valve tube 68 from the inlet valve tube 42 when the inlet valve tube 42 is open. The outlet valve tube 68 is also fluidly connected to a fluid diversion valve 72 such that fluid flows to the fluid diversion valve 72 from the outlet valve tube 68. The fluid diversion valve 72 is fluidly connected to the water outlet 46 such that fluid flows to the water outlet 46 from the fluid diversion valve 72. When fluid flows through the fluid diversion valve 72, fluid also flows into the fluid-retaining cavity 40.

As shown in FIG. 7, one embodiment of the fluid diversion valve 72 is structured such that water that flows into the fluid-retaining cavity 40 flows in a direction perpendicular to the direction of the flow of fluid that flows to the water outlet 46. In other embodiments, the fluid diversion valve 72 may have any structure that is capable of allowing fluid to flow into the fluid-retaining cavity 40 when fluid flows through the fluid diversion valve 72.

In operation, configuring a filling apparatus as described in connection with FIGS. 6 and/or 7 may allow fluid to enter the water outlet 46 at a pressure that is related to the pressure at which water flows through the inlet valve tube 42. For example, if the inlet valve tube 42 is configured to receive fluid from a pressurized fluid source, such as a city water supply, and the fluid that enters the inlet valve tube 42 is directed to the water outlet 46 by an outlet valve tube (e.g., as shown in FIG. 6) and/or an outlet valve tube and a fluid diversion valve (e.g., as shown in FIG. 7), the fluid that enters the water outlet 46 may do so at a pressure that is related to the pressure at which the fluid entered the inlet valve tube 42. The pressure at which the fluid enters the water outlet 46 may be less than the pressure at which the fluid entered the inlet valve tube 42 because some fluid is allowed to enter the fluid retaining cavity through an opening (e.g., as shown in FIG. 6) and/or a fluid diversion valve (e.g., as shown in FIG. 7), either of which may provide for a decrease in pressure. After fluid passes through the water outlet 46, the fluid may then pass through a hose 48 (e.g., as shown in FIGS. 6 and 7) into a water retaining structure (e.g., as shown in FIG. 1). Allowing fluid to enter the water outlet 46 at a pressure that is related to the pressure at which water flows through the inlet valve tube 42 (e.g., in the manner described above) may provide for the displacement of air bubbles in a hose 48 and/or for rapid filling of a water retaining structure, for example.

Figure 8:
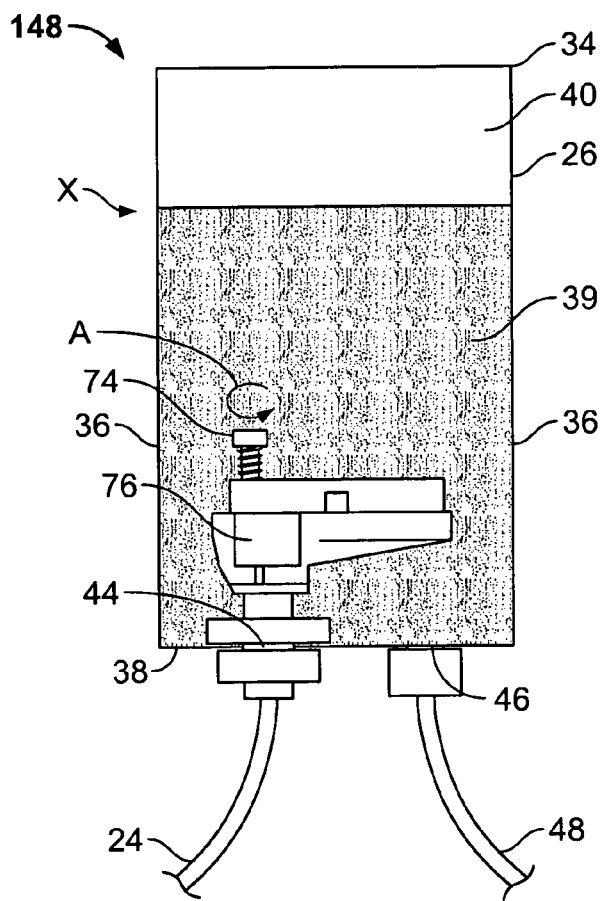
FIG. 8 illustrates a filling apparatus, according to an embodiment of the present invention.

FIG. 8 illustrates a filling apparatus 148, according to an embodiment of the present invention. The filling apparatus 148 is similar to the filling apparatus 14 shown, e.g., in FIG. 1. As such, similar components are numbered accordingly. The filling apparatus 148 includes a pressure sensor (not shown). The pressure sensor detects the pressure inside the fluid-retaining cavity 40. The pressure inside the fluid-retaining cavity 40 varies with the water level x. When the water level x reaches a certain level, a fill valve 76 is open and fluid from the hose 24 is allowed to enter the fluid-retaining cavity 40. When the water level x reaches another level, the fill valve 76 is closed and fluid from the hose 24 no longer enters the fluid-retaining cavity 40.

As shown in FIG. 8, one embodiment of the filling apparatus 148 includes a threaded pressure adjustment member 74. Rotation of the threaded pressure adjustment member 74 varies the pressure at which the fill valve 76 opens. For example, rotation of threaded pressure adjustment member 74 about its longitudinal axis in the direction of arc A may decrease the pressure at which the fill valve 76 opens, and rotation of the threaded pressure adjustment member 74 about its longitudinal axis in the direction opposite of arc A may increase the pressure at which the fill valve 76 opens. Varying the pressure at which the fill valve 76 opens in this manner varies the water level x at which the fill valve 76 opens. In other embodiments, the pressure adjustment member 74 may have any structure that is capable of allowing the pressure at which the fill valve 76 opens to be varied.

In certain embodiments, a filling apparatus that includes a pressure sensor and a fill valve 76 as described in connection with FIG. 8 may also include an outlet valve tube (e.g., similar to the outlet valve tube 68 shown in FIG. 6 and/or the outlet valve tube 69 shown in FIG. 7) fluidly connected to the fill valve 76 such that fluid enters the outlet valve tube when the fill valve 76 is open. In certain embodiments, the outlet valve tube may be fluidly connected to the water outlet 46 and have an opening, e.g., as shown in FIG. 6. In certain embodiments, the outlet valve tube may be fluidly connected to a fluid diversion valve that is fluidly connected to the water outlet 46, e.g., as shown in FIG. 7.

Figure 9:
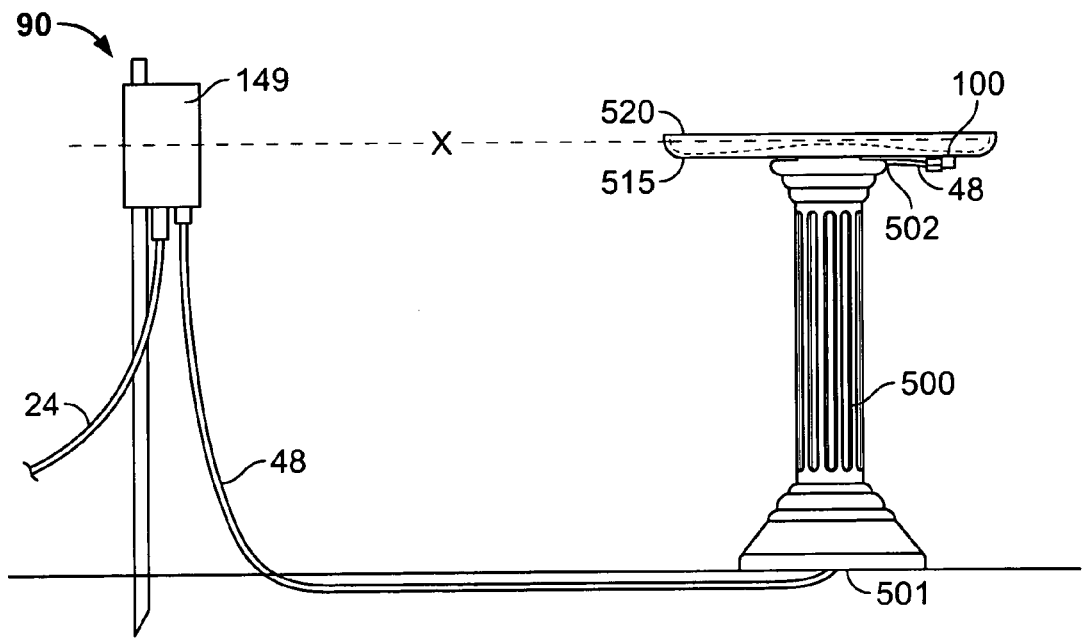
FIG. 9 illustrates an automatic liquid-filling system, according to an embodiment of the present invention.

FIG. 9 illustrates an automatic liquid-filling system 90, according to an embodiment of the present invention. The automatic liquid-filling system 90 is similar to the automatic liquid-filling system 10 shown, e.g., in FIG. 1. As such, similar components are numbered accordingly. The automatic liquid-filling system 90 includes a water supply (not shown), a filling apparatus 149 and a water-retaining structure 520.

As shown in FIG. 9, the filling apparatus 149 is fluidly connected to the water supply (not shown) by a hose 24 such that the filling apparatus 149 receives water from the water supply. The filling apparatus 149 is also fluidly connected to the water-retaining structure 520 by a hose 48 such that the water-retaining structure 520 receives water from the filling apparatus 149. The water level x in the filling apparatus 149 corresponds with the water level x in the water-retaining structure 520.

Figure 11:
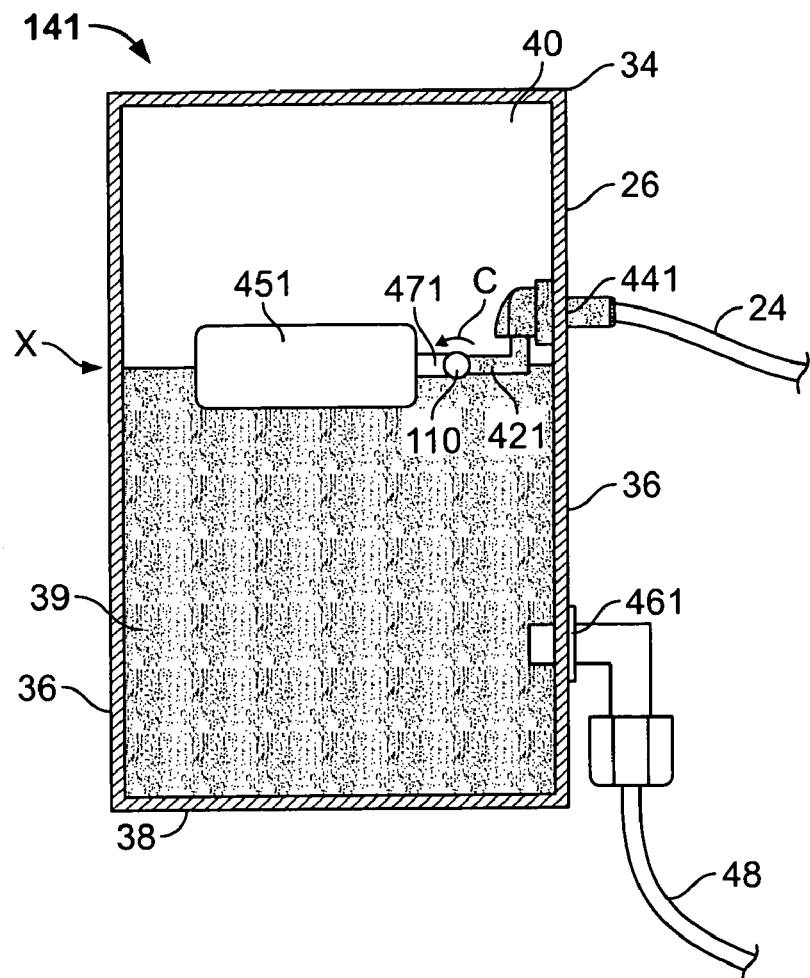
FIG. 11 illustrates a filling apparatus, according to an embodiment of the present invention.

The filling apparatus 149 may be similar to the filling apparatus 14 shown, e.g., in FIG. 1, the filling apparatus 145 shown, e.g., in FIG. 5, the filling apparatus 146 shown, e.g., in FIG. 6, the filling apparatus 147 shown, e.g., in FIG. 7, the filling apparatus 148 shown, e.g., in FIG. 8 and/or the filling apparatus 141 shown, e.g., in FIG. 11.

The water-retaining structure 520 includes a pedestal 500 and a water-retaining basin 520. The pedestal 500 includes a base 501. The pedestal base 501 includes hose inlet (not shown) configured to receive the hose 48. The pedestal includes a hose outlet 502 configured to allow the hose 48 to exit the pedestal 500. The pedestal 500 may be hollow or otherwise configured to allow the hose 48 pass between the hose inlet and the hose outlet 502.

The water-retaining basin 520 includes a base 515 with a water inlet 100 formed therethrough. The water inlet 100 is fluidly connected to the hose 48 such that the basin 520 receives water from the hose 48. Because the hose 48 is fluidly connected to a water inlet 100 formed through the base 515 of the water-retaining basin 520, a bubble-suppression device 54 (shown, e.g., in FIG. 2) may not be used and/or priming the hose 48 to initialize the flow of water to the basin 520 may not be required.

Figure 10:
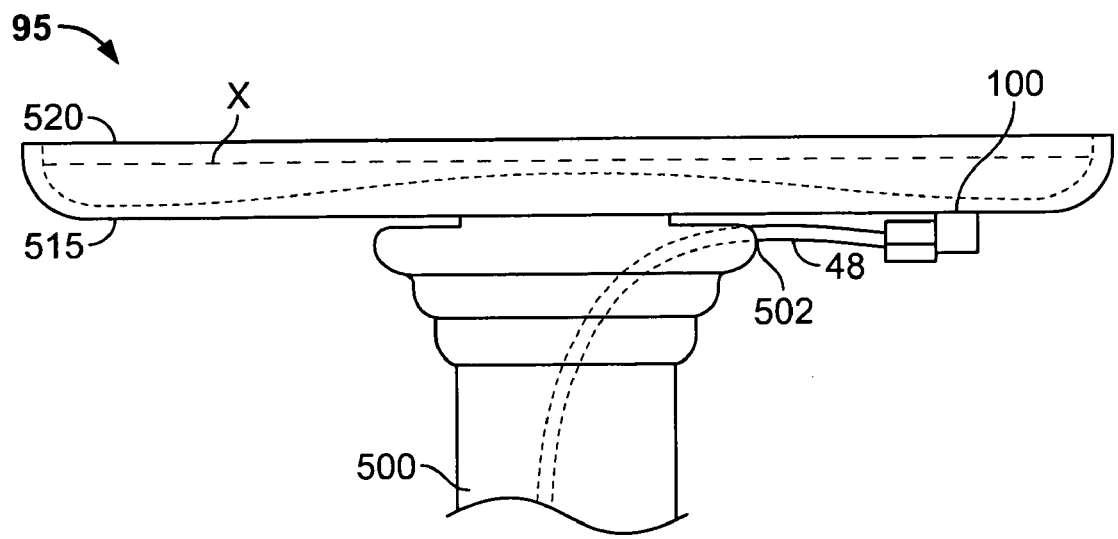
FIG. 10 illustrates a hose assembly, according to an embodiment of the present invention.

FIG. 10 illustrates a hose assembly 95, according to an embodiment of the present invention. In the hose assembly 95, a portion of the hose 48 between the hose outlet 502 and the water inlet 100 is visible from the exterior of the pedestal 500.

In an alternative embodiment, a portion of the hose 48 between the hose outlet 502 and the water inlet 100 may not be visible from the exterior of the pedestal 500. For example, in an embodiment, the hose outlet 502 may be formed through a top portion of the pedestal and be configured to correspond with a water inlet 100 formed through a portion of the basin base 515 that contacts the top portion of the pedestal.

FIG. 11 illustrates a filling apparatus 141, according to an embodiment of the present invention. The filling apparatus 141 is similar to the filling apparatus 14 shown, e.g., in FIG. 1. As such, similar components are numbered accordingly. The filling apparatus 141 includes a water inlet 441 formed through a lateral wall 36 of a main body 34 of a water reservoir 26. The water inlet 441 is fluidly connected to a hose 24, such that the water inlet 441 receives water from the hose 24. The water inlet 441 is also fluidly connected to an inlet valve tube 421, such that the inlet valve tube 421 receives water from said water inlet 441. When the inlet valve tube 421 is open, water flows from the inlet valve tube 421 into a fluid retaining cavity 40 of the water reservoir 26. When the inlet valve tube 421 is closed, water does not flow from the inlet valve tube 421 into the fluid retaining cavity 40.

The filling apparatus 141 includes a float 451, a lever 471 and a pivot 110. The float 451 is a buoyant member that is rigidly connected to the lever 471. The lever 471 is connected to the pivot 110 such that the lever 471 and the float 451 revolve around the pivot 110 when the water level x in the water reservoir 26 changes. For example, when the water level x in the water reservoir 26 goes down, the lever 471 and the float 451 revolve around the pivot 110 in the direction of arc C. Likewise, when the water level x in the water reservoir 26 goes up, the lever 471 and the float 451 revolve around the pivot 110 in the opposite direction of arc C.

In certain embodiments, a filling apparatus may include a float and a pivot, but not a lever. In such embodiments, the float may be connected directly to the pivot, such that the float revolves around the pivot when the water level x in the water reservoir 26 changes.

The filling apparatus 141 is configured such that, at the water level x shown in FIG. 11, the inlet valve tube 421 is closed. In other words, as shown in FIG. 11, the float 451 is in the closed position. As described above, when the water level x in the water reservoir 26 goes down, the float 451 revolves around the pivot 110 in the direction of arc C. When the float 451 has revolved around the pivot 110 forty-five degrees from the closed position, the inlet valve tube is opened. In other words, the float position forty-five degrees from the closed position in the direction of arc C is the open position. When the float 451 is in the open position, the inlet valve tube 421 is opened. Once the inlet valve tube 421 is opened, water flows to the water retaining cavity 40 from the inlet valve tube 421 and the water level x in the water reservoir 26 goes up. As described above, when the water level x in the water reservoir 26 goes up, the float 451 revolves around the pivot 110 in the opposite direction of arc C. When the float 451 has revolved around the pivot 110 forty-five degrees from the open position, the float 451 in the closed position, and the inlet valve tube 421 is closed.

In certain embodiments, the distance between an open position and a closed position may not be forty-five degrees. For example, the distance between an open position and a closed position may be greater than forty-five degrees, which would allow a greater range of motion by the float. In another example, the distance between an open position and a closed position may be less than forty-five degrees, which would allow a lesser range of motion by the float.

The filling apparatus 141 includes a water outlet 461 formed through a lateral wall 36 of a main body 34 of the water reservoir 26. The water outlet 461 is fluidly connected to a hose 48, such that the hose 48 receives water from the water outlet 461. The hose 48 may be fluidly connected to a water-retaining structure (not shown), such that the water level x in the water reservoir 26 is the same as the water level in the water-retaining structure.

In certain embodiments, the water outlet 461 may be formed through any later wall 36 and/or a base 38 of the water reservoir 26, such that the water outlet 461 is below the water level at which the inlet valve tube 421 is opened, e.g., the water level at which water is allowed to begin flowing from the inlet valve tube 421 into the fluid retaining cavity 40 of the water reservoir 26.

In certain embodiments, a filling apparatus such as that described in connection with FIG. 11 may also include an outlet valve tube (e.g., similar to the outlet valve tube 68 shown in FIG. 6 and/or the outlet valve tube 69 shown in FIG. 7) fluidly connected to the inlet valve tube 421 such that fluid enters the outlet valve tube when the inlet valve tube 421 is open. In certain embodiments, the outlet valve tube may be fluidly connected to the water outlet 461 and have an opening, e.g., as shown in FIG. 6. In certain embodiments, the outlet valve tube may be fluidly connected to a fluid diversion valve that is fluidly connected to the water outlet 461, e.g., as shown in FIG. 7.

Embodiments of the present invention provide a safe, efficient, cost-effective manner of automatically filling a water-retaining structure, such as a bird bath, pool, pond, aquarium, or the like. Further, embodiments of the present invention ensure that the water-retaining structure maintains a desired water level.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A filling apparatus for fully automatically filling and continuously maintaining a water-retaining structure absent manual actuation of the apparatus to initiate the filling of the water retaining structure, comprising:
 a water reservoir having a water-retaining cavity, wherein a water inlet and water outlet are formed through said water-retaining cavity;
 an inlet valve connected to said water inlet, wherein said inlet valve is configured to receive water through said water inlet, wherein water passes through said inlet valve when said inlet valve is open, and wherein water is prevented from passing through said inlet valve when said inlet valve is closed;
 a buoyant member positioned within said water-retaining cavity, said buoyant member configured to float within said water-retaining cavity; and
 an outlet valve connected to said inlet valve, wherein said outlet valve tube is configured to receive water from said inlet valve.

2. The apparatus of claim 1, wherein said buoyant member is operatively connected to said inlet valve by a lever.

3. The apparatus of claim 2, wherein said buoyant member is operatively connected to said lever with a translation member, wherein said buoyant member is configured to actuate said lever to open said inlet valve by exerting a force on said translation member when said buoyant member is at said first position.

4. The apparatus of claim 3, wherein said translation member is threaded, wherein said buoyant member is configured to receive said threaded translation member, and wherein rotating said threaded translation member varies said level at which said buoyant member actuates said lever to open said inlet valve.

5. The apparatus of claim 1, further comprising a mounting bracket secured to said water reservoir, wherein said mounting bracket is configured to movably engage a support structure so that said water reservoir may be adjusted to various levels.

6. The apparatus of claim 1, further comprising an inlet hose connected to said water inlet, wherein said inlet hose is also connected to a water supply; and
 an outlet hose connected to said water outlet, wherein said outlet hose is configured to pass water into a water retaining structure.

7. The apparatus of claim 6, wherein said water retaining structure is a basin of a bird bath.

8. The apparatus of claim 7, wherein said basin includes a base, and wherein a water inlet configured to receive water from said outlet hose is formed through said base.

9. The apparatus of claim 1, wherein said outlet valve tube is connected to said water outlet and is configured to pass water through said water outlet, and wherein said outlet valve tube includes an opening, wherein said opening is configured to allow water to enter said water-retaining cavity.

10. The apparatus of claim 1, further including a fluid diversion valve, wherein said fluid diversion valve is connected to said outlet valve tube and said water outlet, wherein said fluid diversion valve is configured to receive water from said outlet valve tube and pass water through said water outlet, and wherein said fluid diversion valve is configured to allow water to enter said water-retaining cavity.

11. A filling apparatus for automatically filling a water retaining structure, comprising:
 a water reservoir having a water-retaining cavity, wherein a water inlet and water outlet are formed through a wall of said water-retaining cavity;
 a pressure sensor configured to detect the pressure inside the water retaining cavity; and
 a fill valve directly connected to said water inlet, wherein said fill valve is configured to selectively open and close based on the pressure detected by the pressure sensor, wherein water is allowed to pass through said fill valve when said fill valve is open, and wherein water is prevented from passing through said fill valve when said fill valve is closed.

12. The apparatus of claim 11, further comprising a mounting bracket secured to said water reservoir, wherein said mounting bracket is configured to movably engage a support structure so that said water reservoir may be adjusted to various levels.

13. The apparatus of claim 11, further comprising an inlet hose connected to said water inlet, wherein said inlet hose is also connected to a water supply;

and an outlet hose connected to said water outlet, wherein said outlet hose is configured to pass water into a water retaining structure.

14. The apparatus of claim 13, wherein said water retaining structure is a basin of a bird bath.

15. The apparatus of claim 14, wherein said basin includes a base, and wherein a water inlet configured to receive water from said outlet hose is formed through said base.

16. The apparatus of claim 11, further including a pressure adjustment member, wherein said pressure adjustment member is threaded, and wherein rotating said threaded pressure adjustment member varies the pressure at which said fill valve opens.

17. The apparatus of claim 11, further including an outlet valve tube connected to said fill valve, wherein said outlet valve tube is configured to receive water from said fill valve.

18. The apparatus of claim 17, wherein said outlet valve tube is connected to said water outlet and is configured to pass water through said water outlet, and wherein said outlet valve tube includes an opening, wherein said opening is configured to allow water to enter said water-retaining cavity.

19. The apparatus of claim 17, further including a fluid diversion valve, wherein said fluid diversion valve is connected to said outlet valve tube and said water outlet, wherein said fluid diversion valve is configured to receive water from said outlet valve tube and pass water through said water outlet, and wherein said fluid diversion valve is configured to allow water to enter said water-retaining cavity.

20. A filling apparatus for automatically filling a water-retaining structure, comprising:

a water reservoir having a water-retaining cavity, wherein a water inlet and water outlet are formed through said water-retaining cavity;

an inlet valve fluidly connected to said water inlet, wherein said inlet valve is configured to receive water through said water inlet, wherein water passes through said inlet valve when said inlet valve is open, and wherein water is prevented from passing through said inlet valve when said inlet valve is closed;

a buoyant member positioned within said water-retaining cavity, said buoyant member configured to float within said water-retaining cavity, a lever that operatively connects said inlet buoyant member to said inlet valve;

a threaded translation member received by said buoyant member, wherein rotation of said threaded translation member varies said level at which said buoyant member actuates said lever to open said inlet valve.

\* \* \* \* \*